(12) United States Patent
Haering et al.

(10) Patent No.: US 8,457,164 B2
(45) Date of Patent: Jun. 4, 2013

(54) FIBER LASER COMPRISING A RING-SHAPED RESONATOR

(75) Inventors: Reto Haering, Munich (DE); Armin Zach, Munich (DE)

(73) Assignee: TOPTICA Photonics AG, Graefeling (DE)

( * ) Notice: Subject to any disclaimer, the term of this patent is extended or adjusted under 35 U.S.C. 154(b) by 0 days.

(21) Appl. No.: 12/734,887

(22) PCT Filed: Nov. 28, 2008

(86) PCT No.: PCT/EP2008/010138
§ 371 (c)(1),
(2), (4) Date: Aug. 9, 2010

(87) PCT Pub. No.: WO2009/068312
PCT Pub. Date: Jun. 4, 2009

(65) Prior Publication Data
US 2010/0296528 A1    Nov. 25, 2010

(30) Foreign Application Priority Data
Nov. 29, 2007   (DE) .................. 10 2007 057 856

(51) Int. Cl.
*H01S 3/30*    (2006.01)
(52) U.S. Cl.
USPC ............................................. 372/6; 372/94
(58) Field of Classification Search
USPC ....................................... 372/6, 94
See application file for complete search history.

(56) References Cited

U.S. PATENT DOCUMENTS

| | | | |
|---|---|---|---|
| 5,436,925 A | 7/1995 | Lin et al. | |
| 5,497,386 A * | 3/1996 | Fontana | 372/18 |
| 5,627,848 A | 5/1997 | Fermann et al. | |
| 6,741,619 B1 * | 5/2004 | Thoen et al. | 372/18 |
| 2002/0071454 A1 | 6/2002 | Lin | |
| 2006/0227816 A1* | 10/2006 | Liu | 372/6 |
| 2007/0153289 A1 | 7/2007 | Yilmaz et al. | |
| 2007/0242346 A1 | 10/2007 | Shiota et al. | |

FOREIGN PATENT DOCUMENTS

| | | |
|---|---|---|
| EP | 1 675 227 | 6/2006 |
| JP | 09-064440 | 3/1997 |
| JP | 2005-347668 | 12/2005 |
| JP | 2005347668 A * | 12/2005 |
| JP | 2006-324613 | 11/2006 |
| WO | WO 01/76025 | 10/2001 |

OTHER PUBLICATIONS

International Search Report.

* cited by examiner

*Primary Examiner* — Yuanda Zhang
(74) *Attorney, Agent, or Firm* — Collard & Roe, P.C.

(57) ABSTRACT

The invention relates to a fiber laser comprising a ring-shaped resonator (3). A first section of the resonator is formed by an optical fiber (7) while a second section of the resonator is formed by an optically pumped amplifier fiber (8). The fiber laser further comprises an injection point (4) for injecting light of a pump light source (1) into the resonator (3) as well as an extraction point (5) for extracting generated laser light from the resonator (3). The aim of the invention is to design a more developed fiber laser. The aim is achieved by providing the resonator (3) with at least one reflective optical component (12, 51) which reflects the laser light circulating in the resonator (3).

10 Claims, 3 Drawing Sheets

FIBER LASER COMPRISING A RING-SHAPED RESONATOR

CROSS REFERENCE TO RELATED APPLICATIONS

Figure 1:
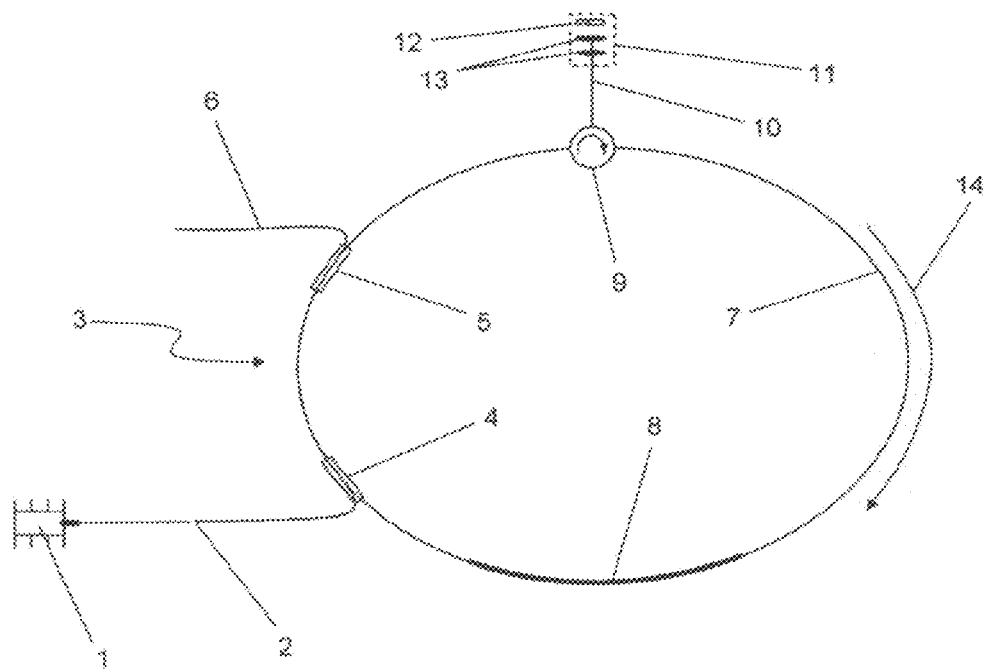

This application is the National Stage of PCT/EP2008/010138 filed on Nov. 28, 2008 which claims priority under 35 U.S.C. §119 of German Application No. 10 2007 057 856.5 filed on Nov. 29, 2007, the disclosure of which is incorporated by reference. The international application under PCT article 21(2) was not published in English.

The invention relates to a fiber laser having a ring-shaped resonator, whereby a first section of the resonator is formed by a light-conducting fiber and a second section of the resonator is formed by an optically pumped amplifier fiber, having an injection point for injecting light of a pump light source into the resonator, and having an extraction point for extracting laser light that has been generated, from the resonator.

It is known that in the case of a fiber laser, an optically pumped amplifier fiber forms the active medium. The amplifier fiber is usually a glass fiber doped with rare earths. In known fiber laser systems, the amplifier fiber is optically pumped by means of a diode laser. The light of the diode laser is injected into the amplifier fiber in suitable manner.

Fiber laser systems having a linear structure are known. In these systems, mirrors are disposed at the two ends of the amplifier fiber, which mirrors, together with the amplifier fiber, form a resonator and allow laser operation. In general, such linear fiber lasers are optically pumped through mirrors disposed at the end surfaces of the amplifier fiber. Diode lasers having a high beam quality are required for this purpose. For extraction, part of the light power is left in the resonator, and another part is used as a useful beam, by means of a beam splitter. This beam splitter can be one of the end mirrors or can be integrated into the resonator as an additional element. In both cases, reflections can be coupled into the resonator as interference signals, by way of the useful beam. A disadvantage of linear fiber laser systems is therefore that they are sensitive to reflective interference. This is particularly true for mode-coupled fiber lasers (femtosecond lasers). The reflective interference signals can lead to a further pulse in the resonator, which already significantly disturbs pulse operation at a low degree of reflection.

For the reasons indicated above, a fiber laser having a resonator in a ring-shaped configuration is preferable to a system having a linear resonator, particularly for mode-coupled fiber lasers. A ring-shaped resonator is significantly less sensitive to reflective interference. In a ring resonator, the laser light that is generated runs in a preferred circulation direction. The reflective interference signals that run opposite this circulation direction can be efficiently suppressed. Another significant advantage of the ring-shaped resonator is that losses are added to the laser light at the extraction point only once per revolution, and this has a positive effect on the quality of the resonator. Finally, a significant advantage of the fiber laser having a ring-shaped resonator is that the pumping efficiency is greater, at the same amplification, than in the case of a fiber laser having a linear resonator. The reason for this is that in the case of a fiber laser having a linear resonator, the amplifier fiber, through which the laser light passes twice, back and forth, is only allowed to be half as long as in the case of a ring-shaped resonator, in order to achieve the same operating conditions at the quasi-three-level laser transitions that are typically used. Fundamentally, less pump light is therefore absorbed in a linear resonator.

A mode-coupled fiber laser having a ring-shaped resonator is known from U.S. Pat. No. 5,436,925. This laser functions according to the so-called CPM principle (English: "Colliding Pulse Mode-Locking"). In this principle, two light pulses run in the resonator, in opposite circulation directions, and interact in a thin, transmissive, saturatable absorber.

Mode coupling for generation of short light pulses is implemented in this manner. A significant disadvantage of the previously known fiber laser is that it works with transmissive optical components that are integrated into the ring-shaped resonator. Optical components for use in mode-coupled lasers, such as, in particular, saturatable absorbers or dispersive fiber gratings, can preferably or fundamentally be operated only in reflection. Particularly in the case of saturatable absorbers, it holds true that the reflectively functioning forms are technologically further developed. The freedom of movement in configuration when designing corresponding mode-coupled fiber lasers is much greater when using saturatable absorber mirrors, because of the resonant superelevation in the mirror, than in the case of corresponding transmissive optical components.

Against this background, it is the task of the invention to make available a fiber laser having a ring-shaped resonator, which laser is developed further as compared with the state of the art, and does not demonstrate the disadvantages indicated above.

The invention accomplishes this task, proceeding from a fiber laser of the type indicated initially, in that the resonator has at least one reflective optical component that reflects the laser light that circulates in the resonator.

According to the invention, reflective optical components are therefore incorporated into the ring-shaped resonator of the fiber laser. In this manner, the disadvantages connected with transmissive optical components are avoided.

Because, according to the invention, reflective optical components are used, fundamentally, sensitivity of the resonator to reflective interference exists once again, specifically on the partial segments through which the light passes in the back and forth direction, i.e. twice. These partial segments must be designed particularly carefully, taking (parasitic) reflections into consideration. In order to avoid negative effects of reflective interference in the ring, it is practical to provide a direction-selective optical component, for example an optical isolator, which suppresses light that circulates in the resonator opposite a preferred circulation direction.

The invention is particularly suitable for implementing a mode-coupled fiber laser. In the fiber laser according to the invention, saturatable semiconductor mirrors, saturatable absorbers, for example on the basis of carbon nanotubes, but also dispersive fiber gratings, chirped mirrors, extraction mirrors, wavelength-selective fiber gratings, Gires-Tournois interferometers, retroreflectors (cat's eyes), optical gratings, so-called grisms (combination of prism and grating), phase-conjugated mirrors or reflectors on the basis of Brillouin scattering, adaptive mirrors, or other adaptive optics are possible as reflective optical components.

According to a preferred embodiment of the invention, the at least one reflective optical component is coupled with the resonator by way of an optical circulator. An advantage of the optical circulator is that it automatically defines a preferred circulation direction in the ring-shaped resonator. Only the laser light that circulates in the "right" direction in the resonator is passed to the reflective optical component by way of the circulator.

In a particularly simple implementation possibility of the fiber laser according to the invention, the at least one reflective optical component is tied into the resonator by way of a free-beam segment. The light is injected into the free-beam segment from one fiber end. Preferably, the light beam does not impact the reflective optical component vertically, so that it is avoided that the light that impacts the reflective optical component and the light reflected by it interfere with one another. The light is then injected back into the ring by way of the same or a second fiber end. In this manner, it is prevented that the system is sensitive to interference resulting from retroreflections. This can also be achieved in that the laser light that circulates in the resonator is extracted from the ring by way of the polarization state, passed to the reflective optical component, and then injected into the ring again. For this purpose, a polarization beam splitter can be provided, by way of which the laser light circulating in the resonator is extracted from the light-guiding fiber or the amplifier fiber and passed to the reflective optical component. The reflected light can be passed back into the light-conducting fiber or the amplifier fiber by way of the same beam splitter. In this embodiment of the fiber laser according to the invention, sections of the resonator in which the light is propagated in the opposite direction, but with a different polarization state, can be formed. These sections form parts of the ring-shaped resonator in which the light waves that run forward and backward, in each instance, do not interfere with one another, although they overlap spatially.

According to a practical embodiment of the invention, the light-conducting fiber and/or the amplifier fiber of the fiber laser are configured to maintain polarization. Because of the use of the polarization-maintaining fibers, the system as a whole is given a reduced sensitivity to interference from the outside.

In an advantageous embodiment of the fiber laser according to the invention, the light that circulates in the resonator is reflected back into a transmissive optical component by means of the reflective optical component, in such a manner that the laser light that circulates in the resonator passed through these multiple times during every revolution. This makes it possible, for example, to efficiently integrate a spectral filter into the resonator. Also, the reflective optical component can be used to reflect the circulating light back into the optically pumped amplifier fiber of the fiber laser. In this case, the laser light passes through the optically pumped amplifier fiber twice during every revolution, without the disadvantages of a fiber laser having a linear resonator, as described initially, having to be accepted.

A commercially available diode laser is a possibility for a pump light source for the fiber laser according to the invention. As a result, the system according to the invention can be implemented in simple and cost-advantageous manner.

A dichroic coupler can be used as an injection point for injecting the light of the pump light source into the resonator. Such couplers, also referred to as WDM couplers, are available prefinished, a low cost.

In the fiber laser according to the invention, the extraction point of the resonator is advantageously configured in such a manner that part of the laser light generated and part of the pump light are extracted from the resonator. The pump light propagates out of the fiber laser together with the generated laser light, and can be used for optical pumping of a subsequent amplifier fiber. In this manner, it is possible to do without additional pump light sources.

Figure 2:
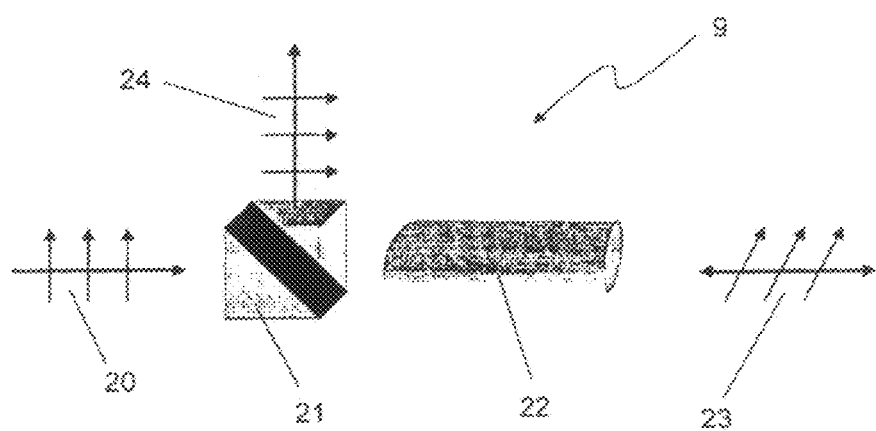
Figure 3:
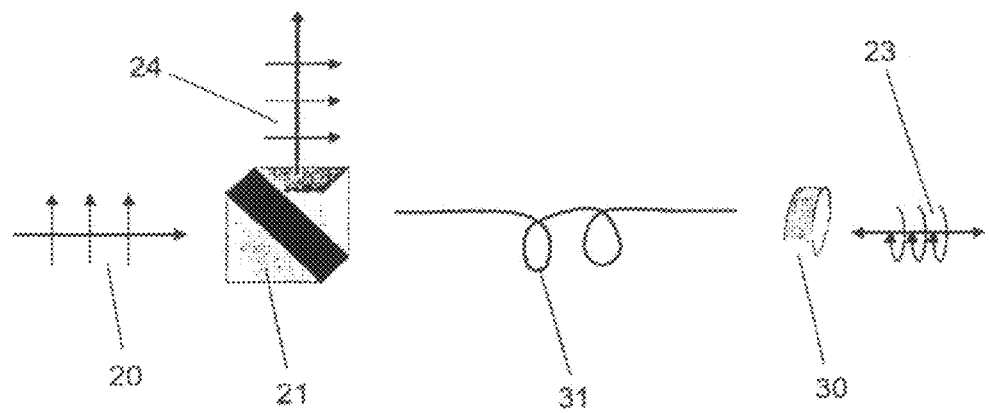
Figure 4:
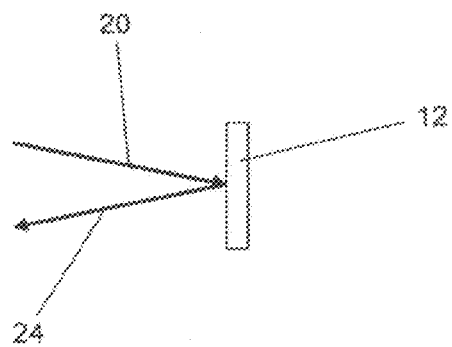
Figure 6:
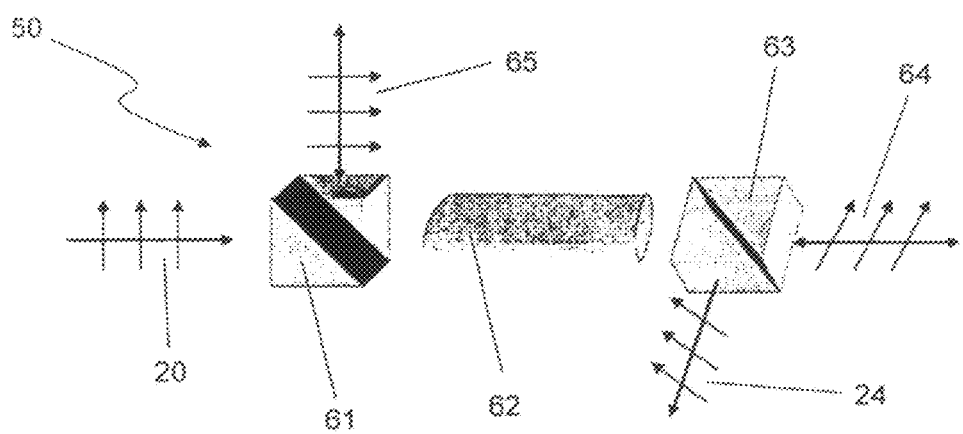
Figure 5:
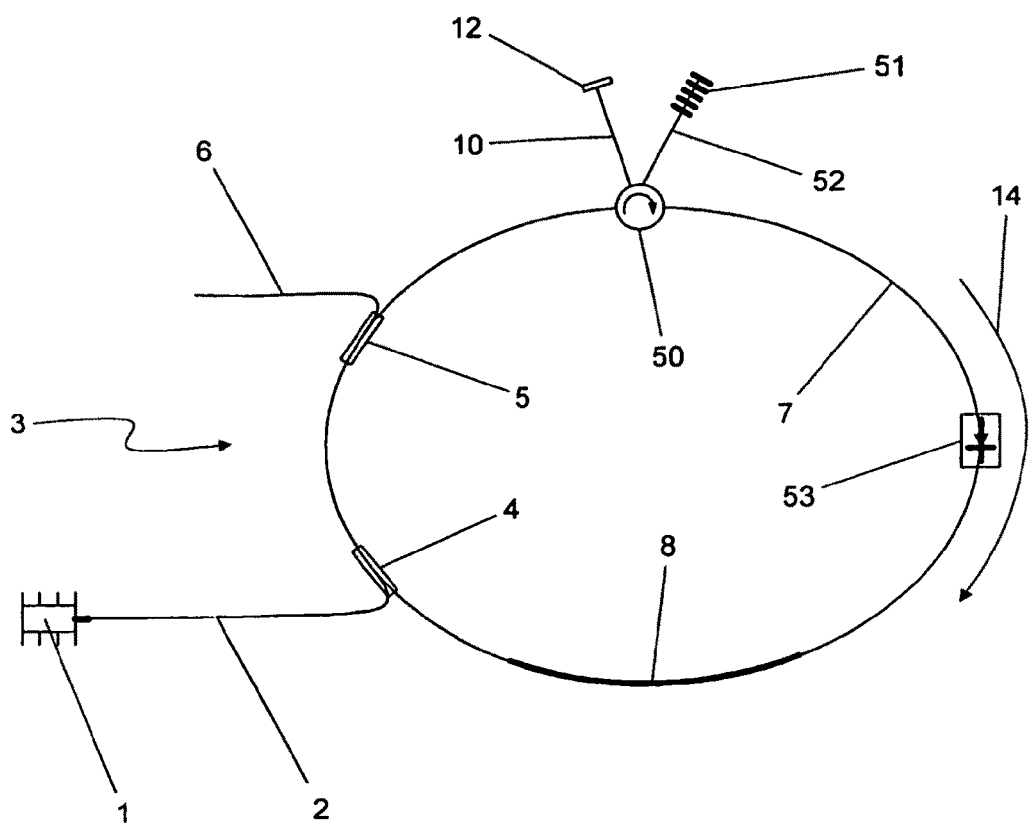

Exemplary embodiments of the invention will be explained in greater detail in the following, using the drawings. These show:

FIG. 1 first exemplary embodiment of a fiber laser according to the invention, having a circulator;

FIG. 2 schematic representation of the principle of functioning of the circulator according to FIG. 1;

FIG. 3 schematic representation of the incorporation of a transmissive optical component in the resonator;

FIG. 4 schematic representation of the incorporation of a reflective optical component in the resonator, by way of a free-beam segment;

FIG. 5 second exemplary embodiment having two reflective optical components incorporated in the resonator;

FIG. 6 circulator arrangement for the exemplary embodiment shown in FIG. 5.

In the exemplary embodiment of the fiber laser according to the invention shown in FIG. 1, a diode laser 1 is provided as a pump light source. Its light is injected into a ring-shaped resonator 3 by way of a fiber piece 2 that is connected with the laser diode 1. For this purpose, the resonator 3 has an injection point 4 in the form of a WDM coupler. Furthermore, an extraction point 5 is provided, which serves for extracting the laser light generated in the resonator 3, into a fiber 6. The resonator 3 has a first section that is formed by a light-guiding fiber 7. The latter is connected with an amplifier fiber 8. The amplifier fiber 8 is a glass fiber doped with erbium ions, for example, which is optically pumped by means of the diode laser. A module 11 is coupled with the resonator 3 by way of an optical circulator 9 and a fiber piece 10. The module 11 comprises a saturable absorber mirror 12 as a reflective optical component, as well as a free-beam segment having a telescope arrangement consisting of two lenses 13, for imaging the light onto the saturable absorber mirror 12. The saturable absorber mirror 12 brings about mode coupling in the resonator 3. The fiber laser shown in FIG. 1 therefore generates short light pulses. Aside from incorporation of the reflective module 11 into the resonator 3, the circulator 9 has the function of defining a preferred circulation direction for the light pulses that circulate in the resonator. Light pulses propagated in the resonator 3 opposite the preferred circulation direction indicated with the arrow 14 are suppressed by means of optical isolation.

FIG. 2 schematically shows the structure and the principle of functioning of the circulator 9. The linearly polarized light beam 20 circulating in the ring resonator formed by the fiber sections 7 and 8 falls on a polarizing beam splitter 21, specifically in such a manner that the transmission (toward the right in the drawing) is maximal. A Faraday rotator 22 rotates the polarization direction in the transmitted light beam 23 by 45° relative to the incident light beam 20. The light beam is reflected back by the saturable absorber mirror 12 (not shown in any detail in FIG. 2) with an unchanged polarization direction. During the second pass through the Faraday rotator 22, the polarization is rotated by a total of 90° relative to the incident beam 20. This leads to a reflection of the light beam reflected back onto the polarization radiator 21, which is injected back into the ring as a light beam 24.

Alternatively, it is also possible to use a λ/4 plate 30 that generates circularly polarized light in place of the Faraday rotator 22. Such an exemplary embodiment is shown in FIG. 3. In this, a fiber piece 31 is additionally provided as a transmissive optical component, through which piece the light extracted from the ring and reflected at the saturable absorber mirror 12 passes in opposite directions. The extracted and retroreflected light in the fiber section 31 has a linear polarization that is different by 90°. Interference therefore does not take place in the additional fiber section 31, despite the spatial overlap of the light that runs back and forth. Parasitic reflections therefore do not disturb laser operation. In place of the fiber piece 31, other modules can be provided, through which the circulating light preferably passes multiple times per ring revolution. For example, a transmissive spectral filter (for example an etalon or an interference filter) can be integrated in place of the fiber piece 31, in order to double the filter effect. It is also possible to provide the optically pumped amplifier fiber at this location of the resonator, in order to double the amplification. The fiber piece 31 can be implemented in polarization-maintaining or also in single-mode fiber technology. When using a single-mode fiber, a Faraday rotator, which becomes a so-called Faraday mirror in the arrangement shown in FIG. 3, is preferred in place of the λ/4 plate 30. This means that variations in the polarization directions of the extracted and retroreflected light, which can be caused by variations in temperature or variations in pressure, for example, are precisely compensated, specifically in such a manner that the polarization directions, in each instance, always stand perpendicular to one another at every location in the fiber piece 31, and no interference occurs.

Another very simple possibility of implementation of the invention is shown in FIG. 4. Here, incorporation of the saturatable absorber mirror 12 takes place as a reflective optical component, by way of a free-beam segment. The light beam 20 extracted from the resonator impacts the saturatable absorber mirror 12 at a slant, so that the extracted light beam 20 and the reflected light beam 24, which is injected back into the resonator, do not overlap spatially. In this manner, interference of the light beams 20 and 24 is avoided.

In the exemplary embodiment shown in FIG. 5, two reflective optical components are incorporated into the resonator 3, specifically by way of a circulator 50, which has a total of four connectors (also referred to as a 2×2 circulator). The reflective optical components again are a saturatable absorber mirror for producing mode coupling, which mirror is directly coupled with the fiber piece 10. The light reflected at the saturatable absorber mirror 12 reaches a dispersive fiber grating 51 that follows in the circulation direction 14, which grating is situated at the reflection end of a fiber section 52, through the circulator 50. After reflection of the light at the dispersive fiber grating 51, the light is again injected back into the ring by way of the circulator 50. In the exemplary embodiment shown in FIG. 5, an optical isolator 53 is additionally required in order to define the circulation direction 15. The reason for this is that the circulator 50 also has a high transmission opposite the preferred circulation direction 14.

FIG. 6 shows a practical implementation possibility of the circulator 50 shown in FIG. 5. The linearly polarized light 20 that circulates in the ring falls onto a first polarization beam splitter 61. A Faraday rotator 62 rotates the polarization direction of the transmitted light by 45°. This brings about the result that a second polarization beam splitter 63, which is rotated by 45° relative to the first polarization beam splitter 61, demonstrates maximum transmission. The transmitted light beam 64 impacts the first reflective component, i.e. the saturatable absorber mirror 12, which is not shown in any detail in FIG. 6, and is maximally transmitted through the polarization beam splitter 63 again after reflection, with the same polarization direction. The Faraday rotator 62 rotates the polarization direction of the light that runs back by another 45°, so that it is reflected at the polarization beam splitter 61. The reflected light 65 falls onto the second reflective component, i.e. onto the dispersive fiber grating 51, which also cannot be seen in FIG. 6. Another passage of the light reflected on the dispersive fiber grating 51 through the Faraday rotator 62 generates a light beam that is reflected at the beam splitter 63 and injected back into the ring as a light beam 24.

The invention claimed is:

1. A fiber laser having a ring-shaped resonator, whereby a first section of the resonator is formed by a light-conducting fiber and a second section of the resonator is formed by an optically pumped amplifier fiber, having an injection point for injecting light of a pump light source into the resonator, and having an extraction point for extracting laser light that has been generated, from the resonator,
   wherein the resonator has at least one reflective optical component that reflects the laser light that circulates in the resonator,
   wherein the at least one reflective optical component is a saturable semiconductor mirror or a saturable absorber,
   wherein the at least one reflective optical component is coupled with the resonator in such a manner that the light that impacts the reflective optical component and the light reflected from the reflective optical component do not interfere with one another,
   wherein the light that impacts the reflective optical component and the light that is reflected from the reflective optical component propagate in opposite directions, with spatial overlap, at least in a partial segment, whereby the light that impacts the reflective optical component and the light reflected by the reflective optical component differ with regard to polarization state on the partial segment,
   wherein the laser light that circulates in the resonator is extracted from the light-guiding fiber or the amplifier fiber by way of a polarization beam splitter, passed to the reflective optical component, and passed back into the light-conducting fiber or the amplifier fiber by way of the polarization beam splitter, and
   wherein the laser light extracted from the light-guiding fiber and reflected by the reflective optical component passes in opposite directions through a piece of polarization-maintaining optical fiber.

2. The fiber laser according to claim 1, further comprising a direction-selective optical component that suppresses light that circulates in the resonator opposite the preferred circulation direction.

3. The fiber laser according to claim 1, wherein the at least one reflective optical component is coupled with the resonator by way of an optical circulator.

4. The fiber laser according to claim 1, wherein the light-guiding fiber and/or the optical fiber are polarization-maintaining.

5. The fiber laser according to claim 1, wherein the light that circulates in the resonator is reflected back into a transmissive optical component via the reflective optical component, so that the laser light that circulates in the resonator passes through the transmissive optical component multiple times during every revolution.

6. The fiber laser according to claim 5, wherein the transmissive optical component is a spectral filter.

7. The fiber laser according to claim 5, wherein the transmissive optical component is the optically pumped amplifier fiber.

8. The fiber laser according to claim 1, wherein the pump light source is a diode laser.

9. The fiber laser according to claim 1, wherein the injection point for injecting the light of the pump light source is a dichroic coupler.

10. The fiber laser according to claim 1, wherein the extraction point extracts part of the generated laser light and part of the pump light from the resonator.

* * * * *